(12) United States Patent
Abusleme et al.

(10) Patent No.: US 10,840,542 B2
(45) Date of Patent: Nov. 17, 2020

(54) METHOD FOR MANUFACTURING A POLYMER ELECTROLYTE SEPARATOR AND POLYMER ELECTROLYTE SEPARATOR THEREFROM

(71) Applicant: SOLVAY SPECIALTY POLYMERS ITALY S.P.A., Bollate (IT)

(72) Inventors: Julio A. Abusleme, Saronno (IT); Riccardo Pieri, Milan (IT); Paolo Fossati, Mariano (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 697 days.

(21) Appl. No.: 14/358,774

(22) PCT Filed: Nov. 6, 2012

(86) PCT No.: PCT/EP2012/071881
§ 371 (c)(1),
(2) Date: May 16, 2014

(87) PCT Pub. No.: WO2013/072216
PCT Pub. Date: May 23, 2013

(65) Prior Publication Data
US 2014/0315080 A1  Oct. 23, 2014

(30) Foreign Application Priority Data
Nov. 17, 2011 (EP) .................................. 11189620

(51) Int. Cl.
*H01M 10/056* (2010.01)
*C08F 214/22* (2006.01)
(Continued)

(52) U.S. Cl.
CPC ....... *H01M 10/056* (2013.01); *C08F 214/186* (2013.01); *C08F 214/225* (2013.01);
(Continued)

(58) Field of Classification Search
CPC .......... H01M 10/056; H01M 10/0564; H01M 10/0565
See application file for complete search history.

(56) References Cited

U.S. PATENT DOCUMENTS 5,609,974 A * 3/1997 Sun ........................ H01M 6/181
204/296
6,162,563 A * 12/2000 Miura .................... H01B 1/122
429/309
(Continued)

FOREIGN PATENT DOCUMENTS

CN       102005609 A  *  4/2011
JP       2007335406 A    12/2007
(Continued)

OTHER PUBLICATIONS

Machine Translation of CN 102005609 A (Year: 2011).*

*Primary Examiner* — Robert S Carrico
(74) *Attorney, Agent, or Firm* — Osha Bergman Watanabe & Burton LLP

(57) ABSTRACT

The invention pertains to a process for manufacturing a polymer electrolyte separator based on a fluoropolymer hybrid organic/inorganic composite, said process comprising: (i) providing a mixture of: —at least one fluoropolymer comprising recurring units derived from at least one (meth)acrylic monomer [monomer (MA)] of formula (I): wherein each of R1, R2, R3, equal or different from each other, is independently a hydrogen atom or a $C_1$-$C_3$ hydrocarbon group, and $R_{OH}$ is a $C_1$-$C_5$ hydrocarbon moiety comprising at least one hydroxyl group [polymer (F)]; —at least one metal compound [compound (M)] of formula: $X_{4-m}AY_m$ wherein m is an integer from 1 to 4, A is a metal selected from the group consisting of Si, Ti and Zr, Y is a hydrolysable group, X is a hydrocarbon group, optionally compris-
(Continued)

ing one or more functional groups; and —at least one electrolyte (E); and —at least one liquid plasticizer (S); (ii) reacting at least a fraction of hydroxyl groups of the ROH groups of said monomer (MA) of said polymer (F) with at least a fraction of said compound (M), so as to obtain a grafted polymer comprising pendant —$Y_{m-1}AX_{4-m}$ groups, with m, Y, A and X having same meaning as above detailed; (iii) hydrolyzing and/or polycondensing compound (M) and/or pendant —$Y_{m-1}AX_{4-m}$ groups, as above detailed to yield a liquid mixture comprising fluoropolymer hybrid organic/inorganic composite comprising inorganic domains and incorporating solvent (S) and electrolyte (E); and (iv) casting a film from the liquid mixture obtained in (iii); (v) drying the film obtained in (iv) for obtaining the polymer electrolyte separator.

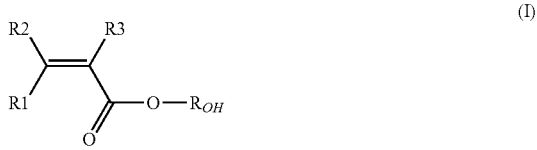

(I)

20 Claims, 1 Drawing Sheet

(51) Int. Cl.
  *H01M 2/16* (2006.01)
  *C08F 214/18* (2006.01)
  *H01M 2/14* (2006.01)
  *C08J 5/22* (2006.01)
  *H01M 10/052* (2010.01)

(52) U.S. Cl.
  CPC .............. *C08J 5/22* (2013.01); *H01M 2/145* (2013.01); *H01M 2/166* (2013.01); *H01M 10/052* (2013.01); *C08J 2327/12* (2013.01)

(56) References Cited

U.S. PATENT DOCUMENTS

| | | | |
|---|---|---|---|
| 6,203,944 B1 | 3/2001 | Turner et al. | |
| 6,537,704 B1 * | 3/2003 | Akashi | H01M 2/0212 |
| | | | 429/300 |
| 7,033,706 B2 * | 4/2006 | Mori | H01B 1/122 |
| | | | 429/306 |
| 2009/0246641 A1 | 10/2009 | Deguchi et al. | |
| 2010/0040927 A1 | 2/2010 | Yoshida et al. | |

FOREIGN PATENT DOCUMENTS

| | | |
|---|---|---|
| WO | 0003444 A1 | 1/2000 |
| WO | 2011121078 A1 | 10/2011 |

* cited by examiner

METHOD FOR MANUFACTURING A POLYMER ELECTROLYTE SEPARATOR AND POLYMER ELECTROLYTE SEPARATOR THEREFROM

This application is a U.S. national stage entry under 35 U.S.C. § 371 of International Application No. PCT/EP2012/071881 filed Nov. 6, 2012, which claims priority to European application No. 11189620.5 filed on Nov. 17, 2011. The entire contents of these applications are explicitly incorporated herein by this reference.

TECHNICAL FIELD

The invention pertains to a method for manufacturing a polymer electrolyte separator based on a hybrid organic/inorganic composite and having an improved ionic conductivity and electrolyte/liquid plasticizer retention ability, to said polymer electrolyte separator, and to a secondary battery including said polymer electrolyte separator.

BACKGROUND ART

In principle, a metal ion secondary battery is formed by assembling a metal (ion) or composite carbon anode, a ion conducting membrane and a composite cathode; the ion conducting membrane, often referred to as separator, plays a crucial role in the cell, as it must provide ion conductivity while ensuring effective separation between the opposite electrodes.

Basically, two types of separators can be used: either porous ones, wherein a solution of an electrolyte in a suitable solvent fills the porosity of the separator, or non-porous ones, which are generally either pure solid polymer electrolyte (i.e. electrolyte dissolved in a high molecular weight polyether host, like PEO and PPO, which acts as solid solvent) or gelled polymer electrolyte system, which incorporates into a polymer matrix a liquid plasticizer or solvent capable of forming a stable gel within the polymer host matrix and an electrolyte.

Fluoropolymers, and in particular, vinylidene fluoride polymers, have been used with success in secondary batteries as raw materials for gelled polymer electrolytes, because of their high anodic stability and their high dielectric constant, which is of assistance in the ionic dissociation of used electrolytes.

Nevertheless, gelled polymer electrolyte might not incorporate and retain the liquid plasticize/electrolyte solution in an effective manner during both manufacturing of the battery and operations of the same, and/or might not possess suitable mechanical properties as required for effective separation of the electrodes.

On the other side, hybridization at the nanometer scale organic and inorganic compounds is an important and evolutionary way to create polymeric compounds having, notably, enhanced mechanical properties. To elaborate such organic-inorganic polymer hybrids, sol-gel processes using metal alkoxides is the most useful and important approach. By properly controlling the reaction conditions of hydrolysis and polycondensation of metal alkoxydes, in particular of alkoxysilanes (e.g. tetramethoxysilane (TMOS) or tetraethoxysilane (TEOS)), in the presence of pre-formed organic polymers, it is possible to obtain hybrids with improved properties compared to the original compounds.

Within this scenario, WO 2011/121078 (SOLVAY SOLEXIS SPA) Jun. 10, 2011 discloses certain fluoropolymer-based hybrid organic/inorganic composites wherein covalent bonds connect fluoropolymer chains to the inorganic domains, obtained by a process involving the reaction of certain functional fluoropolymers possessing hydroxyl groups with certain hydrolysable compounds of Si, Ti, or Zr, and subsequent hydrolysis, polycondensation of said compounds.

This patent document also mentions that the so obtained hybrid organic/inorganic composites can be notably used for the manufacture of membranes for electrochemical applications, and more particularly as separators for lithium batteries. Thus, certain embodiments have been exemplified in such patent document, wherein films made of the mentioned hybrid organic/inorganic composites were swelled with an electrolyte solution comprising a solvent (mixture of ethylene carbonate and propylene carbonate) and an electrolyte ($LiPF_6$). Nevertheless, once the film has been casted, swelling it again with an electrolyte solution is not an easy task, so that final amount of electrolyte solution actually interpenetrated in the separator is relatively low, so as, consequently, the ionic conductivity.

DISCLOSURE OF INVENTION

The Applicant has now surprisingly found that it is possible to manufacture polymer electrolyte separators based on a hybrid organic/inorganic composite having increased electrolyte/liquid plasticizer retention ability and an improved ionic conductibility.

Figure 1:
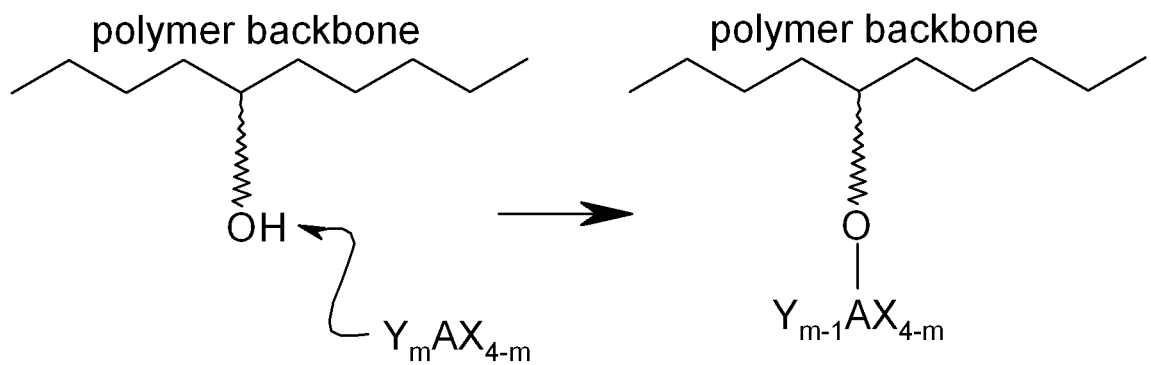
FIG. 1 is a schematic illustration of the condensation reaction between the hydroxyl group of the polymer (F) and the metal compound of formula $Y_mAX_{4-m}$ to obtain a grafted polymer comprising the pendant —$Y_{m-1}AX_{4-m}$ group.

The invention thus provides a process for manufacturing a polymer electrolyte separator based on a fluoropolymer hybrid organic/inorganic composite, said process comprising:

(i) providing a mixture of:
at least one fluoropolymer comprising recurring units derived from at least one (meth)acrylic monomer [monomer (MA)] of formula:

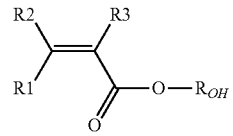

wherein each of R1, R2, R3, equal or different from each other, is independently a hydrogen atom or a $C_1$-$C_3$ hydrocarbon group, and $R_{OH}$ is a $C_1$-$C_5$ hydrocarbon moiety comprising at least one hydroxyl group [polymer (F)];
at least one metal compound [compound (M)] of formula:

$$X_{4-m}AY_m$$

wherein m is an integer from 1 to 4, A is a metal selected from the group consisting of Si, Ti and Zr, Y is a hydrolysable group, X is a hydrocarbon group, optionally comprising one or more functional groups; and
at least one electrolyte (E); and
at least one liquid plasticizer (S);
(ii) reacting at least a fraction of hydroxyl groups of the $R_{OH}$ groups of said monomer (MA) of said polymer (F) with at least a fraction of said compound (M), so as to obtain a grafted polymer comprising pendant —$Y_{m-1}AX_{4-m}$ groups, with m, Y, A and X having same meaning as above detailed; (iii) hydrolyzing and/or polycondensing compound (M) and/or pendant —$Y_{m-1}AX_{4-m}$ groups, as above detailed to yield a liquid mixture comprising fluoropolymer hybrid organic/inorganic composite comprising inorganic domains and incorporating solvent (S) and electrolyte (E); and (iv) casting a film from the liquid mixture obtained in (iii); (v) drying the film obtained in (iv) for obtaining the polymer electrolyte separator.

It has been surprisingly found that when the manufacture of the fluoropolymer hybrid organic/inorganic composite is carried out in the presence of the electrolyte (E) and the liquid plasticizer (S), a self-standing separator stably comprising and retaining high fractions of liquid plasticizer/electrolyte can be obtained, such separator possessing outstanding mechanical properties and having excellent ionic conductivity. In particular ionic conductivity of said polymer electrolyte separator largely exceeds values achievable by swelling/impregnation with electrolyte solutions preformed films of similar fluoropolymer hybrid organic/inorganic composite manufactured without electrolyte (E).

Still another object of the invention is the separator which can be obtained by the process as above described; thus, the invention further pertains to a self-standing polymer electrolyte separator comprising:
  a fluoropolymer hybrid organic/inorganic composite comprising inorganic domains, said hybrid being obtained by reaction between:
    at least one fluoropolymer comprising recurring units derived from at least one (meth)acrylic monomer [monomer (MA)] of formula:

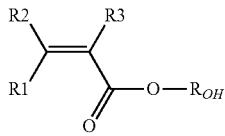

wherein each of R1, R2, R3, equal or different from each other, is independently a hydrogen atom or a $C_1$-$C_3$ hydrocarbon group, and $R_{OH}$ is a $C_1$-$C_5$ hydrocarbon moiety comprising at least one hydroxyl group [polymer (F)]; and
    at least one metal compound [compound (M)] of formula:

wherein m is an integer from 1 to 4, and, according to certain embodiments, from 1 to 3, A is a metal selected from the group consisting of Si, Ti and Zr, Y is a hydrolysable group, X is a hydrocarbon group, optionally comprising one or more functional groups;
wherein the inorganic domains are grafted to the polymer (F) through reaction of at least a fraction of the $R_{OH}$ groups of the monomer (MA) with at least a fraction of compound (M);
  a liquid plasticizer (S); and
  an electrolyte (E),
wherein the weight ratio between the liquid plasticizer (S) and the polymer (F) is of at least 100% wt.

Polymer (F) of the invention is a fluoropolymer, i.e. a polymer comprising, in addition to recurring units derived from monomer (MA), recurring units derived from at least one ethylenically unsaturated monomer comprising at least one fluorine atom.

The term "at least one (meth)acrylic monomer (MA)" is understood to mean that the polymer (F) may comprise recurring units derived from one or more than one (meth)acrylic monomer (MA) as above described. In the rest of the text, the expressions "(meth)acrylic monomer (MA)" and "monomer (MA)" are understood, for the purposes of the present invention, both in the plural and the singular, that is to say that they denote both one or more than one (meth) acrylic monomer (MA).

Polymer (F) comprises preferably at least 0.05, more preferably at least 0.1, even more preferably at least 0.2% moles of recurring units derived from said monomer (MA).

Polymer (F) comprises preferably at most 10, more preferably at most 7.5% moles, even more preferably at most 5% moles, most preferably at most 3% moles of recurring units derived from said monomer (MA).

Determination of average mole percentage of (MA) monomer recurring units in polymer (F) can be performed by any suitable method. Mention can be notably made of acid-base titration methods, well suited e.g. for the determination of the acrylic acid content, of NMR methods, adequate for the quantification of (MA) monomers comprising aliphatic hydrogens in side chains, of weight balance based on total fed (MA) monomer and unreacted residual (MA) monomer during polymer (F) manufacture.

The hydrophilic (meth)acrylic monomer (MA) preferably complies formula:

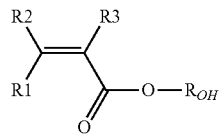

wherein each of R1, R2, $R_{OH}$ have the meanings as above defined, and R3 is hydrogen; more preferably, each of R1, R2, R3 are hydrogen, while $R_{OH}$ has the same meaning as above detailed.

Non limitative examples of hydrophilic (meth)acrylic monomers (MA) are notably hydroxyethyl (meth)acrylate, hydroxypropyl(meth)acrylate; hydroxyethylhexyl(meth) acrylates.

The monomer (MA) is more preferably selected among:
hydroxyethylacrylate (HEA) of formula:

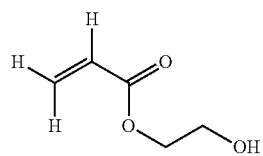

2-hydroxypropyl acrylate (HPA) of either of formulae:

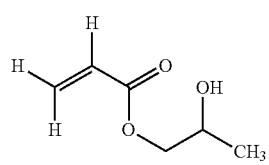

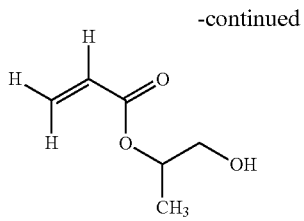

and mixtures thereof.

Most preferably, the monomer (MA) is HPA and/or HEA.

More preferably, the polymer (F) of the invention is a hydrogen-containing fluoropolymer comprising, in addition to recurring units derived from monomer (MA), as above detailed:
- recurring units derived from at least one ethylenically unsaturated monomer comprising at least one fluorine atom (fluorine-containing monomer), different from monomer (MA); and
- recurring units derived from at least one ethylenically unsaturated monomer comprising at least one hydrogen atom (hereinafter, hydrogen-containing monomer), different from monomer (MA).

The fluorine-containing monomer and the hydrogen-containing monomer may be the same monomer or may be different monomers.

Non limitative examples of suitable fluorinated comonomers are notably:
- $C_3$-$C_8$ perfluoroolefins, such as tetrafluoroethylene, and hexafluoropropene;
- $C_2$-$C_8$ hydrogenated fluoroolefins, such as vinyl fluoride, 1,2-difluoroethylene, vinylidene fluoride and trifluoroethylene;
- perfluoroalkylethylenes complying with formula $CH_2$=$CH$—$R_{f0}$, in which $R_{f0}$ is a $C_1$-$C_6$ perfluoroalkyl;
- chloro- and/or bromo- and/or iodo-$C_2$-$C_6$ fluoroolefins, like chlorotrifluoroethylene;
- (per)fluoroalkylvinylethers complying with formula $CF_2$=$CFOR_{f1}$ in which $R_{f1}$ is a $C_1$-$C_6$ fluoro- or perfluoroalkyl, e.g. $CF_3$, $C_2F_6$, $C_3F_7$;
- $CF_2$=$CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl;
- (per)fluoroalkylvinylethers complying with formula $CF_2$=$CFOCF_2OR_{f2}$ in which $R_{f2}$ is a $C_1$-$C_6$ fluoro- or perfluoroalkyl, e.g. $CF_3$, $C_2F_6$, $C_3F_7$ or a $C_1$-$C_6$ (per)fluorooxyalkyl having one or more ether groups, like —$C_2F_6$—O—$CF_3$
- functional (per)fluoro-oxyalkylvinylethers complying with formula $CF_2$=$CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form;
- fluorodioxoles, especially perfluorodioxoles.

Non limitative examples of suitable hydrogen-containing monomers are notably:
- $C_2$-$C_8$, hydrogenated fluoroolefins, such as vinyl fluoride, 1,2-difluoroethylene, vinylidene fluoride and trifluoroethylene;
- perfluoroalkylethylenes complying with formula $CH_2$=$CH$—$R_{f0}$, in which $R_{f0}$ is a $C_1$-$C_6$ perfluoroalkyl;
- non-fluorinated monomers such as ethylene, propylene, vinyl monomers such as vinyl acetate, acrylic monomers, like methyl methacrylate, butyl acrylate, as well as styrene monomers, like styrene and p-methylstyrene.

Polymer (F) comprises preferably more than 1% mol, preferably more than 5% mol, more preferably more than 10% mol of recurring units derived from the hydrogen-containing monomer.

Polymer (F) comprises preferably more than 25% mol, preferably more than 30% mol, more preferably more than 40% mol of recurring units derived from the fluorine-containing monomer.

The fluorine-containing monomer can further comprise one or more other halogen atoms (Cl, Br, I). Should the fluorine-containing monomer be free of hydrogen atom, it is designated as per(halo)fluoromonomer. Should the fluorine-containing monomer comprise at least one hydrogen atoms, it is designated as hydrogen-containing fluorinated monomer.

Should the fluorine-containing monomer be a hydrogen-containing fluorinated monomer, such as for instance vinylidene fluoride, trifluoroethylene, vinylfluoride, the hydrogen-containing fluoropolymer of the invention can be either a polymer comprising, in addition to recurring units derived from monomer (MA), recurring units derived only from said hydrogen-containing fluorinated monomer, or it can be a copolymer comprising recurring units derived from said monomer (MA), said hydrogen-containing fluorinated monomer and from at least one other monomer.

Should the fluorine-containing monomer be a per(halo)fluoromonomer, such as for instance tetrafluoroethylene, chlorotrifluoroethylene, hexafluoropropylene, perfluoroalkylvinylethers, the hydrogen-containing fluoropolymer of the invention is a polymer comprising recurring units derived from said monomer (MA), recurring units derived from said per(halo)fluoromonomer and from at least one other hydrogen-containing monomer different from said monomer (MA), such as for instance ethylene, propylene, vinylethers, acrylic monomers, vinylidene fluoride, trifluoroethylene, vinylfluoride.

Preferred polymers (F) are those wherein the fluorine-containing monomer is chosen from the group consisting of tetrafluoroethylene (TFE), vinylidene fluoride (VDF) and chlorotrifluoroethylene (CTFE).

Most preferably, polymer (F) of the present invention is selected from the group consisting of:
(F-1) polymers comprising recurring units derived from monomer (MA), from at least one per(halo)fluoromonomer selected from TFE and CTFE, and from at least one hydrogenated comonomer selected from ethylene, propylene and isobutylene, optionally containing one or more additional comonomers, typically in amounts of from 0.1 to 30% by moles, based on the total amount of TFE and/or CTFE and said hydrogenated comonomer(s);
(F-2) VDF polymers comprising recurring units derived from monomer (MA), from VDF, and, optionally, from one or more fluorine-containing monomer(s) different from VDF.

In polymers (F-1) as above detailed typically the molar ratio per(halo)fluoromonomer(s)/hydrogenated comonomer(s) is of from 30:70 to 70:30.

In polymers (F-1), the hydrogenated comonomer preferably comprises ethylene, optionally in combination with other hydrogenated comonomers.

Polymers of (F-1) type wherein the per(halo)fluoromonomer is predominantly or CTFE only will be identified herein below as ECTFE copolymers; polymers of (F-1) type wherein the per(halo)fluoromonomer is predominantly or TFE only will be identified herein below as ETFE copolymers.

The ECTFE and/or ETFE copolymers (F-1) preferably comprise:
(a) from 35 to 65%, preferably from 45 to 55%, more preferably from 48 to 52% by moles of ethylene (E);
(b) from 65 to 35%, preferably from 55 to 45%, more preferably from 52 to 48% by moles of at least one of chlorotrifluoroethylene (CTFE) and tetrafluoroethylene (TFE) or mixture thereof; (c) from 0.05 to 10%, preferably from 0.1 to 7.5%, more preferably from 0.2 to 5.0% by moles of monomer (MA).

Among F-1 polymers, ECTFE polymers are preferred.

The VDF polymers (F-2) preferably comprise:
(a') at least 60% by moles, preferably at least 75% by moles, more preferably at least 85% by moles of vinylidene fluoride (VDF);
(b') optionally from 0.1 to 15%, preferably from 0.1 to 12%, more preferably from 0.1 to 10% by moles of a fluorinated comonomer chosen among vinylfluoride (VF$_x$), chlorotrifluoroethylene (CTFE), hexafluoropropene (HFP), tetrafluoroethylene (TFE), trifluoroethylene (TrFE), perfluoromethylvinylether (PMVE) and mixtures therefrom; and
(c) from 0.05 to 10%, preferably from 0.1 to 7.5%, more preferably from 0.2 to 3.0% by moles of monomer (MA).

The compound (M) of formula $X_{4-m}AY_m$ can comprise one or more functional groups on any of groups X and Y, preferably on at least one group X.

In case compound (M) comprises at least one functional group, it will be designated as functional compound (M); in case none of groups X and Y comprises a functional group, compound (M) will be designated as non-functional compound (M).

Mixtures of one or more functional compound (M) and one or more non-functional compound (M) can be used in the process of the invention. Otherwise functional compound(s) (M) or non-functional compound(s) (M) can be separately used.

Functional compounds (M) can advantageously provide for hybrid composites having functional groups, so that further modifying the chemistry and the properties of the hybrid composite over native polymer (F) and native inorganic phase.

As non limitative examples of functional groups, mention can be made of epoxy group, carboxylic acid group (in its acid, ester, amide, anhydride, salt or halide form), sulphonic group (in its acid, ester, salt or halide form), hydroxyl group, phosphoric acid group (in its acid, ester, salt, or halide form), thiol group, amine group, quaternary ammonium group, ethylenically unsaturated group (like vinyl group), cyano group, urea group, organo-silane group, aromatic group.

To the aim of obtaining separators based on hybrid composites having functional groups, it is generally preferred that any of groups X of compound (M) of formula $X_{4-m}AY_m$ comprises one or more functional group, and that m is an integer of 1 to 3, so that advantageously each A atom, after complete hydrolysis/polycondensation, will nevertheless be bound to a group comprising a functional group.

With the aim of manufacturing separators based on fluoropolymer hybrid organic/inorganic composites which can exhibit functional behaviour in terms of hydrophilicity or ionic conductivity, functional group of compound (M) will be preferably selected among carboxylic acid group (in its acid, anhydride, salt or halide form), sulphonic group (in its acid, salt or halide form), phosphoric acid group (in its acid, salt, or halide form), amine group, and quaternary ammonium group; most preferred will be carboxylic acid group (in its acid, anhydride, salt or halide form) and sulphonic group (in its acid, salt or halide form).

The selection of the hydrolysable group Y of the compound (M) is not particularly limited, provided that it enables in appropriate conditions formation of a —O-A≡ bond; said hydrolysable group can be notably a halogen (especially a chlorine atom), a hydrocarboxy group, a acyloxy group, a hydroxyl group.

The metal compound [compound (M)] preferably complies with formula:

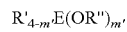

wherein m' is an integer from 1 to 4, and, according to certain embodiments, from 1 to 3, E is a metal selected from the group consisting of Si, Ti and Zr, R' and R", equal to or different from each other and at each occurrence, are independently selected from $C_{1-18}$ hydrocarbon groups, optionally comprising one or more functional groups.

The metal compound [compound (M)] preferably complies with formula:

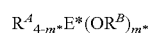

wherein m* is an integer from 2 to 3, E* is a metal selected from the group consisting of Si, Ti and Zr, $R^A$, equal to or different from each other at each occurrence, is a $C_{1-12}$ hydrocarbon group, optionally comprising one or more functional group; $R^B$, equal to or different from each other at each occurrence, is a $C_1$-$C_5$ linear or branched alkyl radical, preferably $R^B$ is methyl or ethyl.

Examples of functional compounds (M) are notably vinyltriethoxysilane, vinyltrimethoxysilane, vinyltrismethoxyethoxysilane of formula $CH_2$=$CHSi(OC_2H_4OCH_3)_3$, 2-(3,4-epoxycyclohexylethyltrimethoxysilane) of formula:

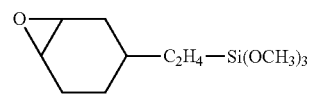

glycidoxypropylmethyldiethoxysilane of formula:

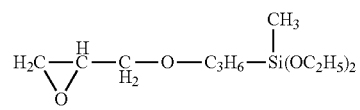

glycidoxypropyltrimethoxysilane of formula:

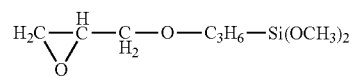

methacryloxypropyltrimethoxysilane of formula:

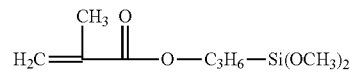

aminoethylaminpropylmethyldimethoxysilane of formula:

aminoethylaminpropyltrimethoxysilane of formula:

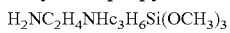

3-aminopropyltriethoxysilane, 3-phenylaminopropyltrimethoxysilane, 3-chloroisobutyltriethoxysilane, 3-chloropropyltrimethoxysilane, 3-mercaptopropyltriethoxysilane, 3-mercaptopropyltrimethoxysilane, n-(3-acryloxy-2-hydroxypropyl)-3-aminopropyltriethoxysilane, (3-acryloxypropyl)dimethylmethoxysilane, (3-acryloxypropyl)methyldichlorosilane, (3-acryloxypropyl)methyldimethoxysilane, 3-(n-allylamino)propyltrimethoxysilane, 2-(4-chlorosulfonylphenyl)ethyltrimethoxysilane, 2-(4-chlorosulphonylphenyl)ethyl trichlorosilane, carboxyethylsilanetriol, and its sodium salts, triethoxysilylpropylmaleamic acid of formula:

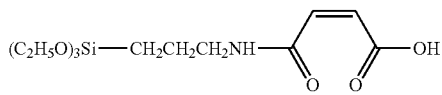

3-(trihydroxysilyl)-1-propane-sulphonic acid of formula $HOSO_2—CH_2CH_2CH_2—Si(OH)_3$, N-(trimethoxysilylpropyl)ethylene-diamine triacetic acid, and its sodium salts, 3-(triethoxysilyl)propylsuccinic anhydride of formula:

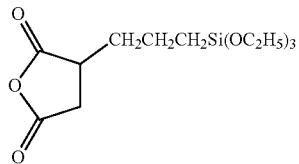

acetamidopropyltrimethoxysilane of formula $H_3C—C(O)NH—CH_2CH_2CH_2—Si(OCH_3)_3$, alkanolamine titanates of formula $Ti(A)_x(OR)_y$, wherein A is an amine-substituted alkoxy group, e.g. $OCH_2CH_2NH_2$, R is an alkyl group, and x and y are integers such that x+y=4.

Examples of non-functional compounds (M) are notably triethoxysilane, trimethoxysilane, tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

The process of the invention comprises reacting at least a fraction of hydroxyl groups of $R_{OH}$ groups of said monomer (MA) of said polymer (F) with at least a fraction of said compound (M), so as to obtain a grafted polymer comprising pendant $—Y_{m-1}AX_{4-m}$ groups, with m, Y, A and X having same meaning as above detailed.

It is understood that —OH groups of the $R_{OH}$ functionalities of monomer (MA) are able to react with the hydrolysable group(s) of the compound (M) so as to yield a covalent bond between the compound (M) moiety and the monomer (MA) moiety, as notably sketched in the scheme of FIG. 1.

One liquid plasticizer (S) or mixtures of liquid plasticizers (S) can be used in the process and separator of the present invention.

The liquid plasticizer (S) is generally selected from the group consisting of ketones, including lower ketones such as acetone, methylethylketone and higher ketones, such as isophorone, methyl isobutyl ketone (MIK), cyclohexanone, diisobutyl ketone; amides such as N,N-dimethylformamide (DMF), N,N-dimethylacetamide, tetramethyl urea; polar aprotic solvents comprising oxygen and/or nitrogen heteroatom(s), such as dimethylsulfoxide (DMSO), tetrahydrofuran (THF), N-methyl-2-pyrrolidone (NMP); organic phosphates such as trimethyl phosphate, triethyl phosphate; glycol ethers such as dipropylene glycol methyl ether, dipropylene glycol dimethyl ether, propylene glycol n-propyl ether, diethylene glycol butyl ether; ester derivatives of glycol ethers, such as diethylene glycol ethyl ether acetate, propylene glycol methyl ether acetate; esters such as methyl difluoroacetate, ethyl difluoroacetate, dimethyl phthalate, glyceryl triacetate, butyrolactone, carbitol acetate; organic carbonates such as ethylene carbonate, propylene carbonate, mixtures of ethylene carbonate and propylene carbonate, dimethyl carbonate, diethyl carbonate, ethyl-methyl carbonate, butylene carbonate, vinylene carbonate, fluoroethylene carbonate, fluoropropylene carbonate; and mixtures thereof.

More preferably, liquid plasticizer (S) which can be used are selected from higher ketones, polar aprotic solvents comprising oxygen and/or nitrogen heteroatom(s), glycol ethers, ester derivatives of glycol ethers, organic phosphates, and organic carbonates, as above detailed, and mixtures thereof.

The amount of liquid plasticizer (S) used in the process of the invention is such that the mixture comprises advantageously at least 100%, preferably at least 120%, more preferably at least 150% wt of liquid plasticizer (S) with respect to the weight of polymer (F).

Upper limit is not particularly limited, being nevertheless understood that after the drying step (v), the amount of liquid plasticizer (S) stably incorporated and retained in the separator will be of at most 1000%, preferably of at most 750%, more preferably of at most 500% wt, with respect to the weight of polymer (F).

Excellent results have been obtained for polymer electrolyte separators wherein the amount of liquid plasticizer (S), after drying step, was of 150 to 500% wt, preferably of 250 to 500% wt, more preferably of 350 to 500% wt with respect to the weight of polymer (F).

Embodiments wherein liquid plasticizer (S) will be used in amounts largely exceeding these final targets values are within the scope of the invention, and might be practiced for e.g. tuning adequate liquid viscosity and workability during steps i), ii) and iii) of the invention, being understood that excess liquid plasticizer (S) will be removed during drying step (v).

According to certain embodiments wherein liquid plasticizer (S) is used in an amount exceeding the target amount in the final polymer electrolyte separator, a mixture of more than one liquid plasticizer (S) can be used; in such cases, it can be useful in those embodiments to use a mixture of a liquid plasticizer (S1) and a liquid plasticizer (S2), different from (S1), wherein at least a fraction of (preferably essentially all) liquid plasticizer (S1) is intended to be maintained in the final polymer electrolyte separator and at least a fraction of (preferably essentially all) liquid plasticizer (S2) is intended to be removed during drying step (iv). In this case, liquid plasticizer (S2) is selected so as to have a boiling point lower than boiling point of liquid plasticizer (S1).

As an example, a lower ketone, like as acetone or methylethylketone, can be used in combination with a mixture of any other of above mentioned exemplary liquid plasticizers (S) different from said lower ketones.

Within these embodiments, the mixture in step (i) can comprise advantageously up to 5000% wt, preferably up to 3000% wt, more preferably up to 1500% wt of liquid plasticizer (S), with respect to the weight of polymer (F).

A variety of metal salts may be employed as electrolyte (E). Metal salts which are stable and soluble in the chosen liquid plasticizer (S) media will be generally selected for the manufacture of the separator of the invention.

Electrolytes (E) suitable are notably $M(PF_6)_n$, $M(BF_4)_n$, $M(ClO_4)_n$, $M(bis(oxalato)borate)_n$ ("$M(BOB)_n$"), $M[N(CF_3SO_2)_2]_n$, $M[N(C_2F_5SO_2)_2]_n$, $M[N(CF_3SO_2)(R_FSO_2)]_n$ with $R_F$ being $C_2F_5$, $C_4F_9$, $CF_3OCF_2CF_2$, $M(AsF_6)_n$, $M[C(CF_3SO_2)_3]_n$, with M being a metal, preferably a transition metal, an alkaline metal or an alkaline-earth metal, more preferably M=Li, Na, K, Cs, and n is the valence of said metal, typically n=1 or 2. It is understood the nature of the metal cation will be selected as a function of the type of secondary battery wherein the separator obtained by the inventive process has to be incorporated.

As generally the polymer electrolyte separators hereby concerned are those suitable for Lithium-ion cells, among preferred electrolytes (E) for this embodiment mention can be made of $LiPF_6$, $LiBF_4$, $LiClO_4$, lithium bis(oxalato) borate ("LiBOB"), $LiN(CF_3SO_2)_2$, $LiN(C_2F_5SO_2)_2$, $M[N(CF_3SO_2)(R_FSO_2)]_n$ with $R_F$ being $C_2F_5$, $C_4F_9$, $CF_3OCF_2CF_2$, $LiAsF_6$, $LiC(CF_3SO_2)_3$ and combinations thereof.

The mixture of step i) of the process of the invention can also conveniently contain at least one redox chemical shuttle. The expression "redox chemical shuttle" refers to an electrochemically reversible compound that during charging of a lithium-ion cell can become oxidized at the positive electrode once the charging potential reaches a desired value, can migrate to the negative electrode, can become reduced at the negative electrode to reform the unoxidized (or less oxidized) shuttle species, and can migrate back to the positive electrode.

For reacting hydroxyl groups of polymer (F) with compound (M) as above described, mixing at room temperature (about 25° C.) is generally considered as effective; nevertheless, the mixture can be also heated at temperatures beyond 25° C. for advantageously increasing kinetics of such reaction.

Generally, in the step i) of mixing polymer (F), compound (M), liquid plasticizer (S) and electrolyte (E), a liquid mixture of liquid plasticizer (S) and electrolyte (E) is preliminarily prepared.

The electrolyte (E) is generally dissolved in liquid plasticizer (S) so as to provide an electrolyte solution (ES) wherein the concentration of the electrolyte is of advantageously at least 0.01, preferably at least 0.025, more preferably at least 0.05 and of at most 1, preferably 0.75, more preferably 0.5 M.

It is also understood that an auxiliary solvent (A) different from liquid plasticizer (S) might be further used in the step i) of the process of the invention; the choice of such auxiliary solvent (A) is not particularly limited, provided that the same has solution ability with respect to the polymer (F) and/or miscibility with liquid plasticizer (S), and does not interact with the intended reactions. Such auxiliary solvent (A) is generally used for tuning viscosity of the mixture so as to ensure appropriate workability of the same during hybrid composite manufacture and/or during casting of the same.

According to an embodiment of the invention, the mixture can further comprise, in addition to compound (M), polymer (F), liquid plasticizer (S) and electrolyte (E) at least one inorganic filler (I).

The addition of such inorganic filler (I) will enable advantageously obtaining polymer electrolyte separators having improved mechanical properties.

The inorganic filler (I) is generally provided in the mixture under the form of particles.

The inorganic filler (I) particles generally have an average particles size of 0.001 μm to 1000 μm, preferably of 0.01 μm to 800 μm, more preferably of 0.03 μm to 500 μm.

The choice of the inorganic filler (I) is not particularly limited; nevertheless, inorganic fillers having on their surface reactive groups towards compound (M) are generally preferred.

Among surface reactive group, mention is notably made of hydroxyl groups.

Without being bound by this theory, the Applicant believes that reaction between at least a fraction of compound (M) with at least a fraction of said surface reactive group of the inorganic filler (I) can occur simultaneously with the reaction of at least a fraction of compound (M) with at least a fraction of the $R_{OH}$ groups of the monomer (MA), so that in subsequent hydrolysis/polycondensation step, chemical bonding between the polymer (F) and the inorganic filler is likely achieved through the inorganic domains derived from compound (M).

Among inorganic fillers (I) suitable for being used in the process of the invention, mention can be made of inorganic oxides, including mixed oxydes, metal sulphates, metal carbonates, metal sulfides and the like.

Among metal oxides, mention can be made of $SiO_2$, $TiO_2$, ZnO, $Al_2O_3$.

A class of compounds which gave particularly good results within the context of this embodiment of the present invention are notably silicates, aluminium-silicates and magnesium silicates, all optionally containing additional metals such as sodium, potassium, iron or lithium.

These silicates, aluminium-silicates and magnesium silicates are generally known as possessing a layered structure.

These silicates, aluminium-silicates and magnesium silicates, all optionally containing additional metals such as sodium, potassium, iron or lithium can be notably smectic clays, possibly of natural origin, such as notably montmorillonites, sauconite, vermiculite, hectorite, saponite, nontronite. As an alternative, silicates, aluminium-silicates and magnesium silicates, all optionally containing additional metals such as sodium, potassium, iron or lithium can be selected among synthetic clays, like notably fluorohectorite, hectorite, laponite.

According to this embodiment, the polymer electrolyte separator obtained by the process of the present invention will comprise said inorganic fillers (I) in the inorganic domains of the fluoropolymer hybrid organic/inorganic composites.

The process further comprises hydrolyzing and/or polycondensing compound (M) and/or pendant $-Y_{m-1}AX_{1-m}$ groups, as above detailed to yield a fluoropolymer hybrid organic/inorganic composite comprising inorganic domains.

The hydrolysis/polycondensation can be carried out simultaneously to the step of reacting hydroxyl groups of polymer (F) and compound (M) or can be carried out once said reaction has occurred.

Typically, in particular for compounds wherein A=Si, this hydrolysis/polycondensation is initiated by addition of at least one appropriate catalyst/reactant. Generally, water or a mixture of water and an acid can be used for promoting this reaction.

The choice of the acid is not particularly limited; both organic and inorganic acids can be used. HCl is among the preferred acids which can be used in the process of the invention.

Generally, the addition of an aqueous medium preferably comprising an acid will be the preferred method for promoting the hydrolysis/polycondensation.

While this hydrolysis/polycondensation can take place at room temperature (25° C.), it is generally preferred to carry out this step upon heating at a temperature exceeding 50° C.

Actual temperatures will be selected having regards to the boiling point and/or stability of the liquid plasticizer (S). Generally temperatures between 20 and 150° C., preferably between 40° C. and 120° C. will be preferred.

Figure 2:
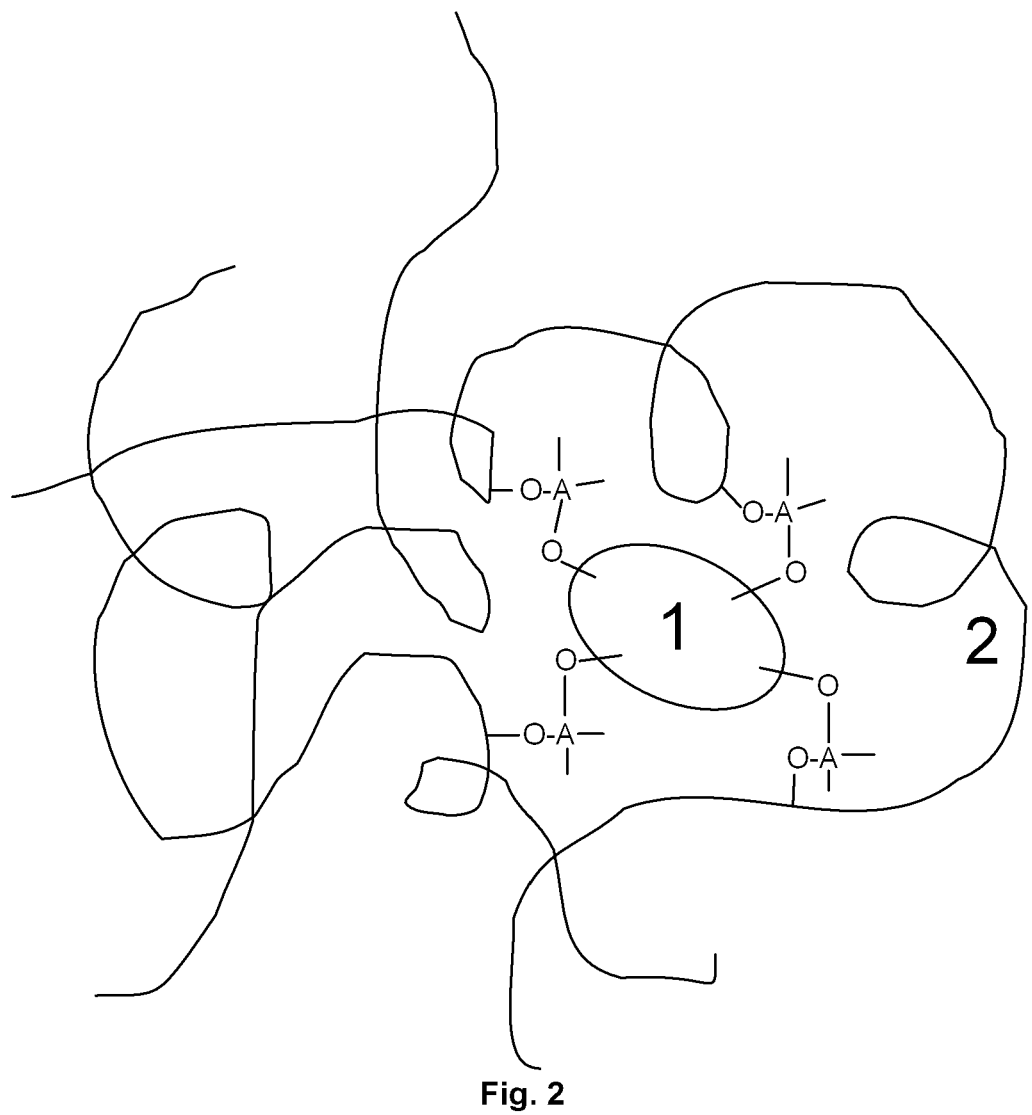
FIG. 2 illustrates a hybrid organic/inorganic composite.

It is understood that in this step, hydrolysable group(s) of the compound (M) will react so as to yield a hybrid composite comprising polymer domain (2) consisting of chains of polymer (F) and inorganic domains (1) consisting of residues derived from compound (M), as notably sketched in the scheme of FIG. 2.

As this will be recognized by the skilled in the art, the hydrolysis/polycondensation reaction generally generate low molecular weight side products, which can be notably water or alcohol, as a function of the nature of the metal compound (M).

It is further understood that while the hydrolysis/polycondensation reaction is initiated in step (iii), said reaction will continue during step (iv) and, more particularly, step (v), as below detailed.

As said, the process of the invention comprises a step (iv) of casting a film from the liquid mixture obtained in (iii).

Techniques for casting a film from a liquid mixture are known in the art; typically the liquid mixture (iii) will be applied by spreading on a support surface using standard devices, according to well-known techniques like doctor blade coating, metering rod (or Meyer rod) coating, slot die coating, knife over roll coating or "gap coating", and the like.

The choice of the support surface is not particularly limited, being understood that the polymer electrolyte separator can be manufactured directly as an unitary assembly with the electrode/collector by casting on the pre-formed electrode itself or can be manufactured by casting onto another support surface, from which said polymer electrolyte separator can be detached and individualized.

The process of the invention finally comprises a step (v) of drying the film obtained in (iv) for obtaining the polymer electrolyte separator.

Drying can be performed under modified atmosphere, e.g. under an insert gas, typically exempt notably from moisture (water vapour content of less than 0.001% v/v), or can be performed under vacuum.

Further, drying step (v) can be performed at room temperature (about 25° C.) or at a temperature exceeding 25° C., this latter condition being generally preferred.

It is also understood that under drying conditions, above mentioned low molecular weight side products generated by the hydrolysis/polycondensation reaction (which can be notably water or alcohol, as a function of the nature of the metal compound (M)) are at least partially removed from the polymer electrolyte separator, possibly further promoting, by combined action of heat and side products removal, additional hydrolysis/polycondensation.

Drying temperature will be selected so as to effect removal by evaporation of auxiliary solvent (A), if any, and, possibly partial evaporation of liquid plasticizer (S).

The polymer electrolyte separator of the invention, despite the large amount of liquid plasticizer contained therein, is self-standing, i.e., be it actually individualized or comprised in a separator/electrode/collector assembly, is possesses suitable mechanical properties for being handled and for withstanding mechanical stresses typical of the final intended use in a metal-ion secondary battery.

The invention finally pertains to a metal-ion secondary battery comprising the polymer electrolyte separator as above detailed.

The metal-ion secondary battery is generally formed by assembling a metal (ion) or composite carbon cathode, the polymer electrolyte separator as above detailed and a composite anode.

According to a first embodiment of the invention, the metal-ion secondary battery is an alkaline or alkaline-earth secondary battery.

Representative cathode (negative electrodes) materials of alkaline or alkaline-earth secondary batteries include:
graphitic carbons able to intercalate alkaline or alkaline-earth metal, typically existing in forms such as powders, flakes, fibers or spheres (for example, mesocarbon microbeads) hosting at least one alkaline or alkaline-earth metal;
alkaline or alkaline-earth metal;
alkaline or alkaline-earth metal alloy compositions, including silicon-based alloys, germanium-based alloys;
alkaline or alkaline-earth metal titanates, advantageously suitable for intercalating alkaline or alkaline-earth metal with no induced strain.

In a preferred variant of this embodiment, the metal-ion is a Lithium secondary battery, wherein the negative electrode material is selected from the group consisting of:
graphitic carbons able to intercalate lithium, typically existing in forms such as powders, flakes, fibers or spheres (for example, mesocarbon microbeads) hosting lithium;
lithium metal;
lithium alloy compositions, including notably those described in U.S. Pat. No. 6,203,944 (3M INNOVATIVE PROPERTIES) 20 May 2001 and/or in WO 00/03444 (MINNESOTA MINING) 10 Jun. 2005;
lithium titanates, generally represented by formula $Li_4Ti_5O_{12}$; these compounds are generally considered as "zero-strain" insertion materials, having low level of physical expansion upon taking up the mobile ions, i.e. $Li^+$;
lithium-silicon alloys, generally known as lithium silicides with high Li/Si ratios, in particular lithium silicides of formula $Li_{4.4}Si$;
lithium-germanium alloys, including crystalline phases of formula $Li_{4.4}Ge$.

The negative electrode may contain additives as will be familiar to those skilled in the art. Among them, mention can be made notably of carbon black, graphene or carbon nanotubes. As will be appreciated by those skilled in the art, the negative electrode or cathode may be in any convenient form including foils, plates, rods, pastes or as a composite made by forming a coating of the negative electrode material on a conductive current collector or other suitable support.

Representative anode (positive electrodes) materials of alkaline or alkaline-earth secondary batteries include composites comprising a polymer binder (PB), a powdery electrode material and, optionally, an electroconductivity-imparting additive and/or a viscosity modifying agent.

In the case of forming a positive electrode for a Lithium ion battery, the active substance may comprise a composite metal chalcogenide represented by a general formula of $LiMY_2$, wherein M denotes at least one species of transition metals such as Co, Ni, Fe, Mn, Cr and V; and Y denotes a chalcogen, such as O or S. Among these, it is preferred to use a lithium-based composite metal oxide represented by a general formula of $LiMO_2$, wherein M is the same as above. Preferred examples thereof may include: $LiCoO_2$, $LiNiO_2$, $LiNi_xCo_{1-x}O_2$ (0<x<1), and spinel-structured $LiMn_2O_4$. An electroconductivity-imparting additive may be added in order to improve the conductivity of a resultant composite electrode, particularly in case of using an active substance, such as $LiCoO_2$, showing a limited electron-conductivity. Examples thereof may include: carbonaceous materials, such as carbon black, graphite fine powder and fiber, and fine powder and fiber of metals, such as nickel and aluminum.

As per the polymer binder (PB), polymers well known in the art can be used including, preferably, vinylidene fluoride (VDF) polymers and even more particularly, VDF polymers comprising recurring units derived from VDF and from 0.01 to 5% moles of recurring units derived from at least one (meth)acrylic monomer [monomer (MA)] of formula:

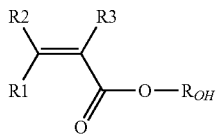

wherein each of R1, R2, R3, equal or different from each other, is independently a hydrogen atom or a $C_1$-$C_3$ hydrocarbon group, and $R_{OH}$ is a hydrogen atom or a $C_1$-$C_5$ hydrocarbon moiety comprising at least one hydroxyl group.

Should the disclosure of any patents, patent applications, and publications which are incorporated herein by reference conflict with the description of the present application to the extent that it may render a term unclear, the present description shall take precedence.

The invention will be now described with reference to the following examples whose purpose is merely illustrative and not limitative of the present invention.

PREPARATIVE EXAMPLE 1 ACCORDING TO THE INVENTION

Step j) Manufacture of a VDF/HFP/HEA Copolymer

In a 4 l reactor equipped with an impeller running at a speed of 880 rpm were introduced in sequence 2455 g of demineralized water and 0.63 g of METHOCEL® K100 GR suspending agent.

The reactor was vented and pressurized with nitrogen to 1 bar, then 8.55 g of a 75% by volume solution of t-amyl perpivalate initiator in isododecane were introduced into the reactor, followed by 107 g of HFP monomer and 947 g of VDF monomer. The reactor was then gradually heated to 52° C. to a final pressure of 110 bar. Temperature was maintained constant at 55° C. throughout the whole trial. Pressure was maintained constant at 110 bar throughout the whole trial by feeding a 19.96 g/l aqueous solution of HEA monomer to a total of 709 ml. After 510 minutes the polymerization run was stopped by degassing the suspension until reaching atmospheric pressure. The polymer so obtained was then recovered, washed with demineralised water and oven-dried at 50° C. (814 g).

The polymer so obtained contained 2.3% by moles of HFP and 1.0% by moles of HEA, as determined by NMR.

Step jj) Manufacture of a Hybrid VDF-HFP-HEA/Silica Polymer Electrolyte Material 30 mL of N-methyl-2-pyrrolydone (NMP) and 0.65 g of lithium perchlorate were mixed under magnetic stirring at room temperature until complete dissolution occurred and a clear single phase solution of $LiClO_4$ in NMP having a concentration equal to 0.2 M was obtained.

Then 6 g of the VDF/HFP/HEA polymer as obtained from step j) were added at room temperature. After the dissolution of the polymer was completed, 6 g of tetraethylorthosilicate (TEOS); then 6 mL of an aqueous HCl solution 0.1M were slowly trickled in the solution under vigorous magnetic stirring.

After about 1 hour mixing at 60° C., a viscous liquid mixture was obtained having the following weight ratios (calculated assuming complete TEOS hydrolysis/polycondensation to $SiO_2$ and complete retention of NMP): $SiO_2$/ VDF-HFP-HEA polymer component: 29% NMP/VDF-HFP-HEA polymer component: 500%.

Step jjj) Casting of a Polymer Electrolyte Separator from Polymer Electrolyte Material of Step jj)

Viscous liquid mixture obtained as above detailed was casted on a support plate with a Doctor Blade system on a support plate, and solvent was removed at 80° C. under vacuum for 1 hour, to yield a self-standing separator having a thickness of about 500 μm.

PREPARATIVE EXAMPLE 2 OF COMPARISON

Step i) Manufacture of a VDF-HFP-HEA Copolymer

Same polymer as in step j) of Example 1 was used.

Step ii) Manufacture of a Hybrid VDF-HFP-HEA/Silica Composite 1.4 grams of the terpolymer mentioned in step i) were dissolved in 23.2 grams of N-methylpyrrolidone (NMP). Then, 2.08 grams of TEOS were added drop-wise to the stirred solution, followed by 0.999 ml of aqueous HCl (0.1 M); the mixture was stirred at 60° C. for 2 hours to ensure the TEOS hydrolysis and polycondensation so as to obtain a clear solution of a hybrid VDF-HEA/silica composite having the following weight ratio (calculated assuming complete TEOS hydrolysis/polycondensation to $SiO_2$): $SiO_2$/VDF-HFP-HEA polymer component: 42.8%

Step iii) Casting of a Film of a Hybrid VDF-HFP-HEA/Silica Composite

The resulting solution was casted with a Doctor Blade system on a support plate, and solvent was removed at 130°

C. under vacuum for 6 hours. The resulting film was smooth, homogeneous, and opaque. Film thickness was about 30-40 µm.

Step iv) Swelling and Impregnation with Electrolyte Solution for Obtaining Polymer Electrolyte Separator Small samples of the film obtained from Step iii) were dipped in electrolyte solution consisting of LiPF$_6$ 1M in a mixture of ethylene carbonate/propylene carbonate (1/1 weight), at room temperature in a dry glove-box for 24 hours, so to reach the equilibrium. After removal of excess solution, the extent of swelling (Sw) of the so-swelled film (i.e. the resulting polymer electrolyte separators) was determined was determined using the following equation:

$$S_w = \frac{W - W_0}{W_0} \times 100$$

wherein W$_0$ is the weight of dried film and W is the weight of swelled film. A swelling of 39% wt was measured, corresponding to a solvent (liquid plastomer)/VDF polymer weight ratio of 56% wt.

PREPARATIVE EXAMPLE 3 OF COMPARISON

Step q) Manufacture of the VDF-HFP-HEA Copolymer

Same copolymer as in example 1 j) was used.

Step qq) Manufacture of a Hybrid VDF-HFP-HEA Polymer Electrolyte Material

Same procedure as detailed in example 1 jj) was used but no TEOS nor HCl were added, so as resulting material was a viscous liquid composition of VDF/HFP/HEA copolymer and electrolyte solution.

Step qqq) Attempts of Casting of a Polymer Electrolyte Separator from Polymer Electrolyte Material of Step qq)

Viscous liquid mixture obtained as above detailed was casted on a support plate with a Doctor Blade system on a support plate, and dried at 80° C. under vacuum for 1 hour. Despite repeated attempts, no self-standing film was obtained so that no separator could be actually manufactured.

Conductivity Measurements of Polymer Electrolyte Separator Thereof

The polymer electrolyte separators of Ex. 1 and 2C were put between two stainless steel electrodes and sealed in a container. The resistance of the polymer electrolyte separators were measured and the ionic conductivity σ was obtained using the following equation $$\sigma = \frac{d}{(R_b \times S)}$$

wherein d is me thickness of the film, R$_b$ the bulk resistance and S is the area of the stainless steel electrode.

Results for separators obtained from examples 2C and for the inventive separator of Example 1 are summarized in table 1 herein below.

TABLE 1

| Ref. | SiO$_2$/VDF polymer weight ratio (%) origin | % | Solvent/VDF polymer weight ratio (%) | Conductivity (S/cm) |
|---|---|---|---|---|
| Ex. 1 | TEOS | 29 | 500% | 1 × 10$^{-3}$ |
| Ex. 2C | TEOS | 42.8 | 56% | 2.1 × 10$^{-4}$ |

The invention claimed is:

1. A process for manufacturing a polymer electrolyte separator based on a fluoropolymer hybrid organic/inorganic composite, said process comprising:
  (i) providing a mixture of:
    at least one fluoropolymer comprising recurring units derived from at least one (meth)acrylic monomer (MA) of formula:

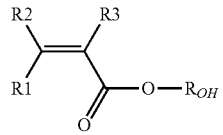

wherein each of R1, R2, R3, equal or different from each other, is independently a hydrogen atom or a C$_1$-C$_3$ hydrocarbon group, and R$_{OH}$ is a C$_1$-C$_5$ hydrocarbon moiety comprising at least one hydroxyl group [polymer (F)];
    at least one metal compound (M) of formula:

X$_{4-m}$AY$_m$ wherein m is an integer from 1 to 4, A is a metal selected from the group consisting of Si, Ti, and Zr, Y is a hydrolysable group, X is a hydrocarbon group, optionally comprising on or more functional groups;
    at least one electrolyte (E); and
    at least one liquid plasticizer (S);
  (ii) reacting at least a fraction of hydroxyl groups of the R$_{OH}$ groups of said monomer (MA) of said polymer (F) with at least a fraction of said compound (M), so as to obtain a grafted polymer comprising pendant —Y$_{m-1}$AX$_{4-m}$ groups;
  (iii) hydrolyzing and/or polycondensing compound (M) and/or pendant —Y$_{m-1}$AX$_{4-m}$ groups, to yield a liquid mixture comprising fluoropolymer hybrid organic/inorganic composite comprising inorganic domains and incorporating liquid plasticizer (S) and electrolyte (E);
  (iv) casting a film from the liquid mixture obtained in (iii); and
  (v) drying the film obtained in (iv) to obtain the polymer electrolyte separator,
  wherein the liquid plasticizer (S) is selected from the group consisting of isophorone, methyl isobutyl ketone (MIK), cyclohexanone, diisobutyl ketone, polar aprotic solvents comprising oxygen and/or nitrogen heteroatom(s), glycol ethers, ester derivatives of glycol ethers, organic phosphates, and organic carbonates, and mixtures thereof, and
  wherein the polymer electrolyte separator is self-standing.

2. The process of claim 1, wherein polymer (F) is selected from the group consisting of:
- (F-1) polymers comprising recurring units derived from monomer (MA), from at least one per(halo)fluoromonomer selected from tetrafluoroethylene (TFE) and chlorotrifluoroethylene (CTFE), and from at least one hydrogenated comonomer selected from ethylene, propylene and isobutylene, optionally containing one or more additional comonomers; and
- (F-2) VDF polymers comprising recurring units derived from monomer (MA), from vinylidene fluoride (VDF), and, optionally, from one or more fluorine-containing monomer(s) different from VDF.

3. The process of claim 2, wherein polymer (F) is a VDF polymer (F-2) comprising:
- (a') at least 60% by moles of vinylidene fluoride (VDF);
- (b') optionally from 0.1 to 15% by moles of a fluorinated comonomer selected from vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures thereof; and
- (c) from 0.05 to 10% by moles of monomer (MA).

4. The process of claim 3, wherein polymer (F) is a VDF polymer (F-2) comprising:
- (a') at least 85% by moles of vinylidene fluoride (VDF);
- (b') optionally from 0.1 to 10% by moles of a fluorinated comonomer selected from vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures thereof; and
- (c) from 0.2 to 3.0% by moles of monomer (MA).

5. The process of claim 1, wherein monomer (MA) is selected from the group consisting of:

hydroxyethylacrylate (HEA) of formula:

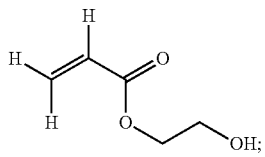

2-hydroxypropyl acrylate (HPA) of either of formulae:

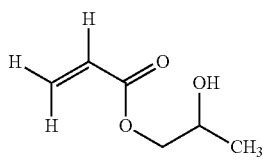

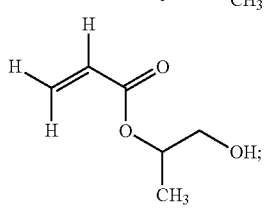

and mixtures thereof.

6. The process of claim 1, wherein the metal compound (M) complies with formula:

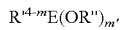

wherein m' is an integer from 1 to 4, E is a metal selected from the group consisting of Si, Ti and Zr, R' and R", equal to or different from each other and at each occurrence, are independently selected from $C_{1-18}$ hydrocarbon groups, optionally comprising one or more functional groups.

7. The process of claim 6, wherein metal compound (M) complies with formula:

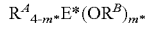

wherein m* is an integer from 2 to 3, E* is a metal selected from the group consisting of Si, Ti and Zr, $R^A$, equal to or different from each other at each occurrence, is a $C_{1-12}$ hydrocarbon group, optionally comprising one or more functional group; $R^B$, equal to or different from each other at each occurrence, is a $C_1$-$C_5$ linear or branched alkyl radical.

8. The process of claim 7, wherein $R^B$ is methyl or ethyl.

9. The process of claim 1, wherein the mixture of step (i) further comprises at least one inorganic filler (I).

10. A metal-ion secondary battery comprising the polymer electrolyte separator obtained by the process of claim 1.

11. The metal-ion secondary battery of claim 10, further comprising a metal, metal ion, or composite carbon cathode and a composite anode.

12. A polymer electrolyte separator comprising:
- a fluoropolymer hybrid organic/inorganic composite comprising inorganic domains, said hybrid being obtained by reaction between:
  - at least one fluoropolymer comprising recurring units derived from at least one (meth)acrylic monomer (MA) of formula:

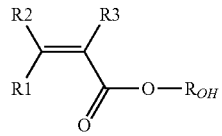

wherein each of R1, R2, R3, equal or different from each other, is independently a hydrogen atom or a $C_1$-$C_3$ hydrocarbon group, and $R_{OH}$ is a $C_1$-$C_5$ hydrocarbon moiety comprising at least one hydroxyl group [polymer (F)]; and
  - at least one metal compound (M) of formula:

wherein m is an integer from 1 to 4, A is a metal selected from the group consisting of Si, Ti and Zr, Y is a hydrolysable group, X is a hydrocarbon group, optionally comprising one or more functional groups;
  wherein the inorganic domains are grafted to the polymer (F) through reaction of at least a fraction of the $R_{OH}$ groups of the monomer (MA) with at least a fraction of compound (M);
- a liquid plasticizer (S); and
- an electrolyte (E),
wherein the weight ratio between the liquid plasticizer (S) and the polymer (F) is of at least 100% wt,
wherein the solvent (S) is selected from the group consisting of isophorone, methyl isobutyl ketone (MIK), cyclohexanone, diisobutyl ketone, polar aprotic solvents comprising oxygen and/or nitrogen heteroatom(s), glycol ethers, ester derivatives of glycol ethers, organic phosphates, and organic carbonates, and mixtures thereof, and wherein the polymer electrolyte separator is self-standing.

13. The polymer electrolyte separator of claim 12, wherein the amount of liquid plasticizer (S) is of 150 to 500% wt with respect to the weight of polymer (F).

14. The polymer electrolyte separator of claim 13, wherein the amount of liquid plasticizer (S) is of 350 to 500% wt with respect to the weight of polymer (F).

15. The polymer electrolyte separator of claim 12, wherein the electrolyte (E) is selected from the group consisting of $M(PF_6)_n$, $M(BF_4)_n$, $M(ClO_4)_n$, M(bis(oxalato)borate)$_n$ ("M(BOB)$_n$"), $M[N(CF_3SO_2)_2]_n$, $M[N(C_2F_5SO_2)_2]_n$, $M[N(CF_3SO_2)(R_FSO_2)]_n$, $M(AsF_6)_n$, and $M[C(CF_3SO_2)_3]_n$, wherein $R_F$ is $C_2F_5$, $C_4F_9$, or $CF_3OCF_2CF_2$, M is a metal, and n is the valence of said metal.

16. The polymer electrolyte separator of claim 15, wherein M is selected from Li, Na, K, and Cs, and n is 1 or 2.

17. The polymer electrolyte separator of claim 12, wherein polymer (F) is a VDF polymer (F-2) comprising:

(a') at least 60% by moles of vinylidene fluoride (VDF);

(b') optionally from 0.1 to 15% by moles of a fluorinated comonomer selected from vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures thereof; and (c) from 0.05 to 10% by moles of monomer (MA).

18. The polymer electrolyte separator of claim 17, wherein polymer (F) is a VDF polymer (F-2) comprising:

(a') at least 85% by moles of vinylidene fluoride (VDF);

(b') optionally from 0.1 to 10% by moles of a fluorinated comonomer selected from vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures thereof; and (c) from 0.2 to 3.0% by moles of monomer (MA).

19. A metal-ion secondary battery comprising the polymer electrolyte separator according to claim 12.

20. The metal-ion secondary battery of claim 19, further comprising a metal, metal ion, or composite carbon cathode and a composite anode.

* * * * *